United States Patent
Mizobuchi et al.

(10) Patent No.: US 7,554,530 B2
(45) Date of Patent: Jun. 30, 2009

(54) TOUCH SCREEN USER INTERFACE FEATURING STROKE-BASED OBJECT SELECTION AND FUNCTIONAL OBJECT ACTIVATION

(75) Inventors: Sachi Mizobuchi, Tokyo (JP); Eigo Mori, Koshigaya (JP)

(73) Assignee: Nokia Corporation, Espoo (FI)

( * ) Notice: Subject to any disclaimer, the term of this patent is extended or adjusted under 35 U.S.C. 154(b) by 1179 days.

(21) Appl. No.: 10/328,193

(22) Filed: Dec. 23, 2002

(65) Prior Publication Data

US 2004/0119763 A1 Jun. 24, 2004

(51) Int. Cl.
*G09G 5/00* (2006.01)
(52) U.S. Cl. ............................ 345/173; 345/156; 715/863
(58) Field of Classification Search .......... 345/173–179, 345/18.01, 18.1, 19.01, 156–157; 178/18.01, 178/19.01; 715/831, 856, 863
See application file for complete search history.

(56) References Cited

U.S. PATENT DOCUMENTS

| | | | | |
|---|---|---|---|---|
| 5,491,495 A | | 2/1996 | Ward et al. | 345/173 |
| 5,570,113 A | * | 10/1996 | Zetts | 345/173 |
| 5,572,651 A | * | 11/1996 | Weber et al. | 715/863 |
| 5,600,765 A | * | 2/1997 | Ando et al. | 345/668 |
| 5,784,061 A | * | 7/1998 | Moran et al. | 715/863 |
| 5,867,150 A | * | 2/1999 | Bricklin et al. | 345/173 |
| 5,966,126 A | * | 10/1999 | Szabo | 715/762 |
| 6,249,606 B1 | * | 6/2001 | Kiraly et al. | 382/195 |
| 6,525,749 B1 | * | 2/2003 | Moran et al. | 715/863 |
| 2002/0011990 A1 | * | 1/2002 | Anwar | 345/173 |
| 2002/0097229 A1 | * | 7/2002 | Rose et al. | 345/173 |

* cited by examiner

*Primary Examiner*—Regina Liang
(74) *Attorney, Agent, or Firm*—Harrington & Smith, PC

(57) ABSTRACT

A method is disclosed to operate a touch screen user interface. The method includes forming a stroke that encloses an area that contains at least a portion of at least one displayed object; and selecting the at least one displayed object. Forming the stroke may further include extending the stroke to a functional object, and activating the functional object with the at least one selected displayed object. If the stroke does not define an area that is totally enclosed by the stroke, the method may further include automatically continuing the stroke such that the area is totally enclosed by the stroke. In this case the stroke may be automatically continued by drawing a line that connects a stroke starting point to a stroke ending point, and by adding touch screen coordinates covered by the line to a list of touch screen coordinates that describe the stroke. If the stroke encloses an area that contains at least a portion of a plurality of displayed objects, each of the displayed objects is simultaneously selected.

19 Claims, 3 Drawing Sheets

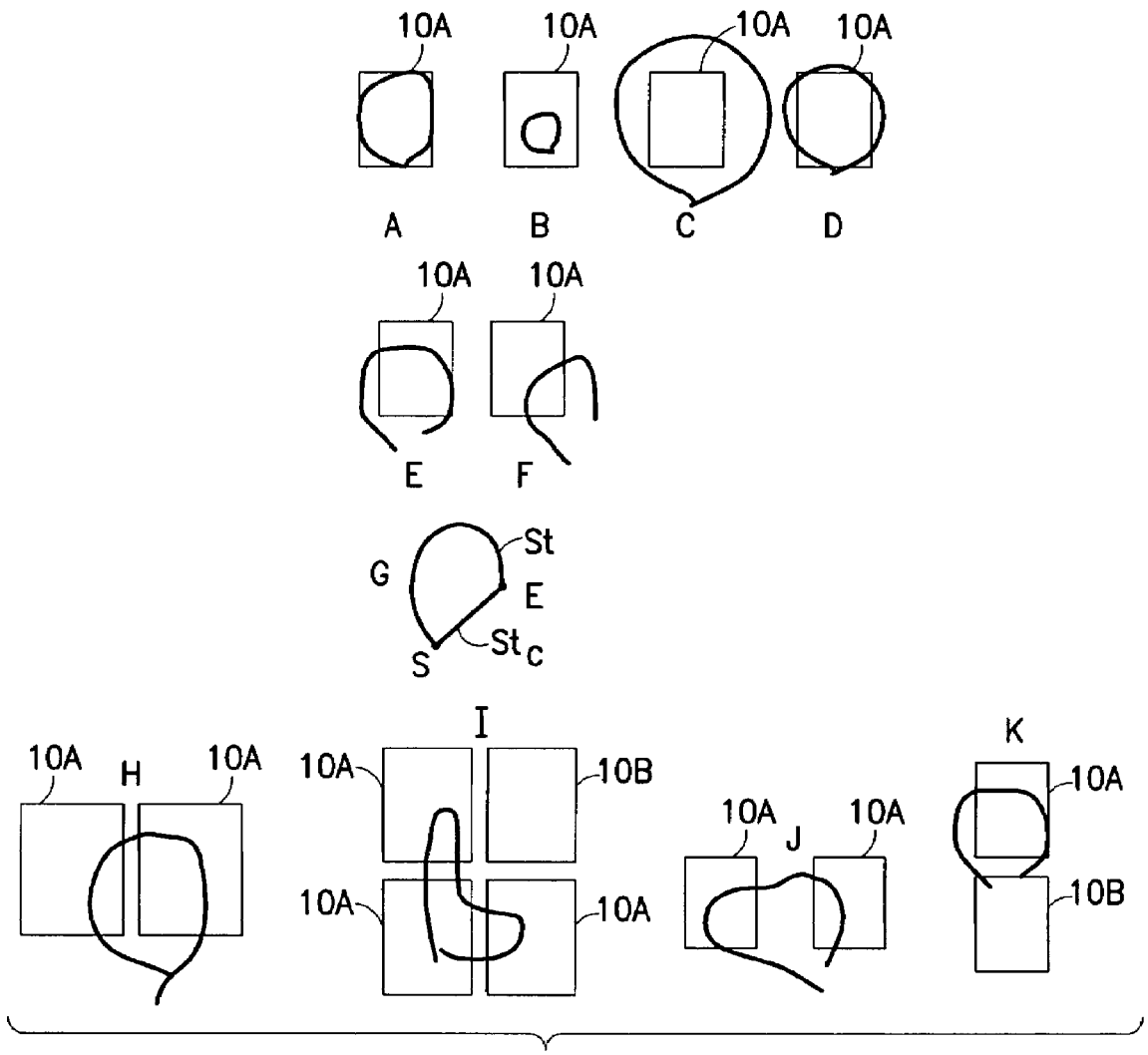
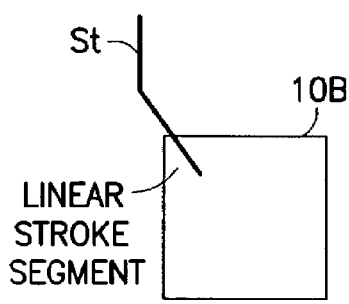
FIG.5A
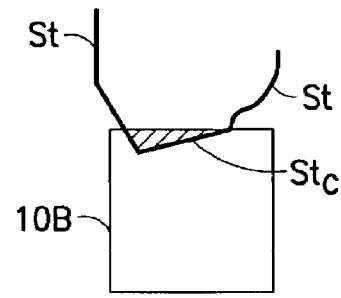
FIG.5B
FIG.4

TOUCH SCREEN USER INTERFACE FEATURING STROKE-BASED OBJECT SELECTION AND FUNCTIONAL OBJECT ACTIVATION

TECHNICAL FIELD

These teachings relate generally to touch screen display devices and to user interfaces, as well as to hand-held equipment, such as cellular telephones, personal communicators and personal digital assistants, that include touch sensitive input devices.

BACKGROUND

Conventional stylus-based or pen-based devices, such as personal digital assistants (PDAs), offer a graphical user interface (GUI). In the GUI, menu objects are typically visually presented on a touch screen as graphical icons. A user can open a directory, start an application, or open a certain document by pointing to "activatable" graphical (menu) objects.

With most conventional pen-based devices, a point-to-activate interaction is used. That is, touching the pen to a menu object displayed on the touch screen immediately causes some action related to the touched object (e.g., opening the document or starting the application). However, this type of "touch-and-go" operation can occasionally result in an unintended and unexpected activation, such as when the user accidentally touches a displayed menu object without having the intent to start some action. The accidental launching of an application, or the opening of a file, is an annoyance to the user, and reduces the usability of the device.

In the conventional mouse-based GUI, the menu object selection and activation operations are separated. For example, a single click selects (focuses) an object, and a double click activates the object. However, there are few pen-based device which adopt this type of two-step activation.

With some pen-based UI, such as Windows CE™ (Microsoft Corporation), an object can be selected, without being activated, when it is pointed to for longer than some predetermined amount of time. However, this type of selection operation does not avoid the problem of mispointing, such as by accidentally touching the screen at a location that corresponds to a menu object.

It is also known in the prior art that some systems (such as an electronic tablet user interface) offer a drag-and-drop technique for a pen-based device. The typical procedures of drag-and-drop manipulation are: 1) select (focus) an object, 2) drag the object to a desired application icon, and 3) drop the object over the icon. However, since it is normally required to release the pen tip between the first and second operations, mis-selection can occur at this point, and the user may lose multiple focuses when pointing to an object.

SUMMARY OF THE PREFERRED EMBODIMENTS

The foregoing and other problems are overcome, and other advantages are realized, in accordance with the presently preferred embodiments of these teachings.

The use of this invention reduces the occurrence of mispointing errors in a touch screen-based, point-to-activate system. This invention replaces the conventional single touch of the stylus onto the surface of the touch screen with a requirement that the user draw a pattern, such as a circle, adjacent to or otherwise in association with a displayed object that the user wishes to select. This line-based or stroke-based, as opposed to point-based, input method increases selection reliability, and also facilitates the selection of multiple objects, as a single line or a single stroke may drawn to encompass a plurality of menu objects, thereby selecting all of the encompassed objects, and avoids the loss of focus when the user desires to simultaneously select multiple objects.

This invention also provides a technique to separate object selection and activation, and to then connect these two processes seamlessly. The use of this invention also provides users with a more intuitive manipulation of objects on a touch screen than can be achieved with the traditional menu selection from menu lists.

In one aspect this invention provides a method to operate a touch screen user interface. The method includes forming a stroke that encloses an area that contains at least a portion of at least one displayed object; and selecting the at least one displayed object. Forming the stroke may further include extending the stroke to a functional object, and activating the functional object with the at least one selected displayed object. If the stroke does not define an area that is totally enclosed by the stroke, the method may further include automatically continuing the stroke such that the area is totally enclosed by the stroke. In this case the stroke may be automatically continued by drawing a line that connects a stroke starting point to a stroke ending point, and by adding touch screen coordinates covered by the line to a list of touch screen coordinates that describe the stroke. The stroke may enclose an area that contains at least a portion of a plurality of displayed objects, and in this case the step of selecting simultaneously selects each of the plurality of displayed objects.

In another aspect this invention provides a device, such as, but not limited to, a handheld communications device that has a graphical user interface that includes a touch screen display and a display processor coupled to the touch screen display. The display processor operates in accordance with a stored program so as to be responsive to a user of the handheld communications device forming a stroke on the touch screen display for determining an area encompassed by the stroke, and for indicating whether at least one displayed icon is contained wholly or partially within the determined area, thereby enabling the at least one icon to be selected by the user.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 3A shows an example of a process for selecting multiple objects and associating the multiple selected objects with an application, while

FIGS. 4A-4K are various examples of the use of this invention when selecting single and multiple objects from a touch-screen display; and FIGS. 5A and 5B are useful in explaining two non-selection cases that relate to the lowermost object shown in FIG. 4K.

DETAILED DESCRIPTION OF THE PREFERRED EMBODIMENTS

Figure 1:
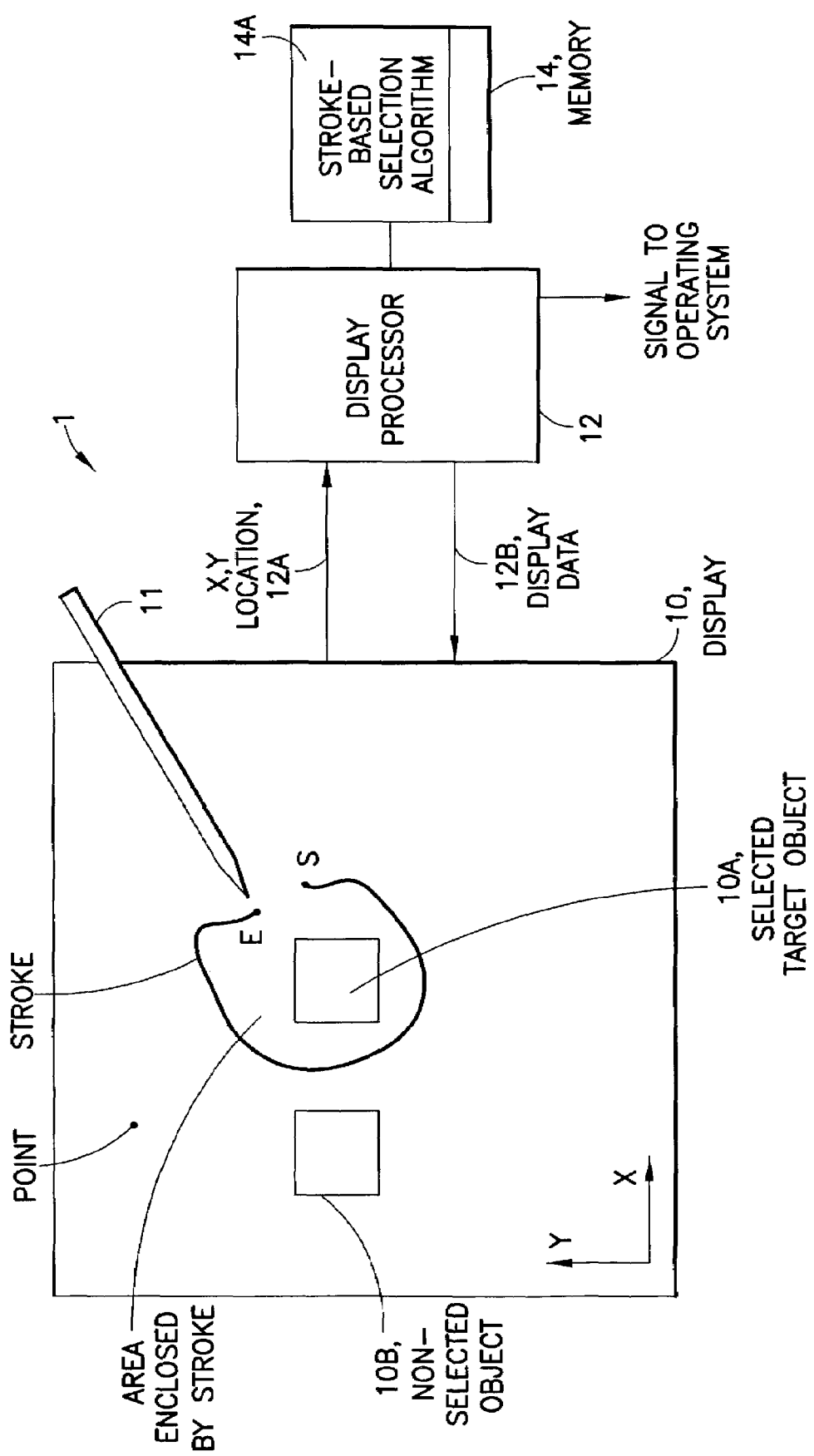
FIG. 1 is a simplified block diagram of a portion of a device that incorporates a touch-screen and a display processor that operates in accordance with this invention.

FIG. 1 is a simplified block diagram of a portion of a device 1 that incorporates a touch-screen display 10, used with a stylus or pen 11 (or simply with the finger of a user), and a display processor 12. The display 10 and pen 11 together form a user interface of the device 1, and may be configured as a graphical user interface. The display processor 12 is coupled to a computer readable storing medium, such as memory 14, embodied with computer code that stores a stroke-based selection algorithm for causing the display processor 12 to operate in accordance with this invention. It is assumed that a first link 12A exists between the display 10 and the processor 12 for the processor 12 to receive x,y coordinate information that is descriptive of the location of the tip of the pen 11 relative to the surface of the display 10. The display 10 is typically pixelated, and may contain liquid crystal (LC) or some other type of display pixels. As such, the display processor 12 provides display data directly or indirectly to the display 10 over a second link 12B for activating desired pixels, as is well known in the art. A given x-y location on the surface of the display 10 may correspond directly or indirectly to one or more display pixels, depending on the pixel resolution and the resolution of the touch-screen itself. A single Point on the touch-screen display 10 (a single x,y location) may thus correspond to one pixel or to a plurality of adjacent pixels. Differing from the Point, a Stroke (or Line) is assumed to have a starting x,y point (S) and an ending x,y point (E), and to include some number of x,y locations between S and E. Touching the tip of the pen 11 to the surface of the display 10 is generally assumed to mark starting point S of the Stroke, and subsequently lifting the tip of the pen 11 from the surface of the display 10 is generally assumed to mark the end point of the Stroke. Touching the tip of the pen 11 to the surface of the display 10, and subsequently lifting the tip of the pen 11 from the surface of the display 10, without moving the tip over the surface of the display 10, is generally assumed to mark a Point.

Note that the Stroke encloses completely or partially an area on the surface of the display. In accordance with this invention, if the area contains (wholly or partially) a display object, then the object becomes a selected target object 10A. Other displayed objects, not within the area (within the bounds of the Stroke) can be referred to, at least for the present, as a non-selected object 10B.

The device 1 may be, by example, a PDA, or a cellular telephone, or a personal communicator, or a tablet computer, or any type of device capable of containing the touch-screen display 10 and associated support electronics, such as the display processor 12. Note that the display processor 12 need not be dedicated to the task of operating the touch-screen display, and may be responsible as well for performing other tasks in the device 1.

Note as well that the display processor 12 may not in and of itself actually select one or more displayed objects that are encompassed within the area defined by a Stroke. Instead, the display processor 12 may send a signal to a higher level of software, such as the operating system, for identifying the object(s) indicated by the user with the pen 11. This is also true for the embodiment described below in reference to FIGS. 3A and 3B (e.g., the display processor 12 may not have the capabilities to actually delete selected objects, or attach a selected object to an email.)

Figure 2A:
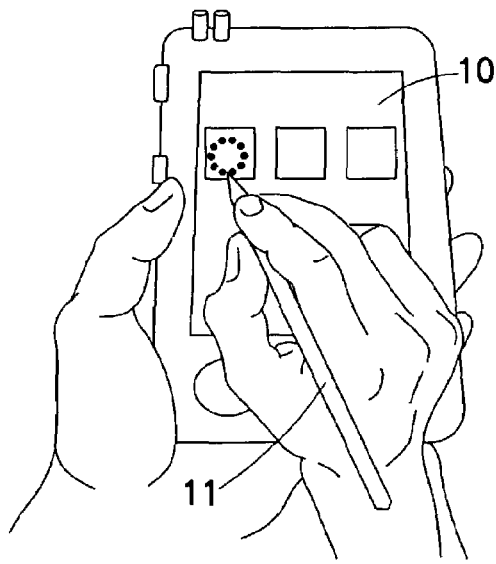
FIGS. 2A and 2B show the device of FIG. 1, and illustrate a process for selecting an object in accordance with this invention.
Figure 2B:
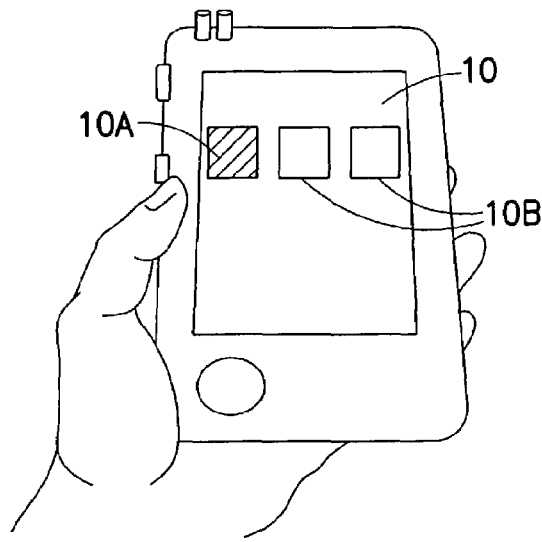

FIGS. 2A and 2B show the device of FIG. 1, and illustrate a process for selecting an object in accordance with this invention. Note in FIG. 2B that the leftmost displayable object is the selected target object 10A, as a result of forming the Stroke as shown in FIG. 2A within the object.

In general, the display processor 12 and stroke-based selection algorithm 14A detect if an activatable area of the display 10 has been encircled by a locus of a pen points. An activatable area is one that includes all or a portion of a displayed object. As was shown in reference to FIG. 1, processor 12 detects the starting point (S-point) and the ending point (E-point) of the Stroke. The starting point is the beginning of the locus of pen points, and the ending point is the termination of the locus of pen points. The result is the generation of an area on the surface of the display 10 that is bounded by the locus of pen points between S and E, referred to herein generically as a "circle". Of course, the resulting sequence of pen points need not trace out a true circle, or even an approximation to a circle. What is important is that the Stroke enclose an area on the surface of the display 10, and that this area includes all or a part of a displayable object, such as an icon depicting, for example, a folder or a file. As is shown in FIG. 1, as well as in FIGS. 4A, 4B, 4D, 4E, 4F and 4G, the Stroke need not necessarily encircle the entire target object 10A, and in fact the Stroke may reside totally within or only partially within the target object 10A. Thus, if the entire Stroke is within an activatable object, the object is selected (FIGS. 4A, 4B). If a part of the Stroke lies outside the activatable object, and the intersection between the area of object and the area enclosed by the Stroke is greater than some threshold, then the object is selected (FIGS. 4E, 4F). Note in this regard that in FIG. 4K the uppermost object is a selected target object 10A, while the lowermost object is a non-selected object 10B, even though the Stroke partially intersects the area of the lowermost object. If the entire object is within a Stroke, the object is selected (FIGS. 1, 4C).

Note as well, and referring to FIG. 4G, that the stroke-based selection algorithm 14A may "finish" a Stroke where the S and E points are not coincident. The part of the Stroke St that is completed by the stroke-based selection algorithm 14A is designated as $St_C$. As one non-limiting example, $St_C$ can be formed by simply taking the shortest path between S and E, and then including the traversed display coordinate locations in a list of x-y coordinates that define St.

For the case of FIG. 4K, assume first that the stroke-based selection algorithm 14A does not complete the Stroke circle, as in FIG. 4G. In this case, and referring to FIG. 5A, the only part of the Stoke that lies within the lowermost object is a linear segment of the Stoke. The linear Stroke segment does not enclose an area, and is thus not considered by the stroke-based selection algorithm 14A. Now assume as a second case, and referring to FIG. 5B, that the stroke-based selection algorithm 14A does complete the Stroke circle, as in FIG. 4G, by adding the Stoke completion segment $St_C$. The Stroke may then in this case be considered to enclose an area (shown cross-hatched) that encompasses a part of the display object. However, it may be assumed in this case that the area is less than some threshold area (e.g., less than about 5% of the area of the display object), and the stroke-based selection algorithm 14A in this case does not signal that the lowermost display object is a selected target object, and the object simply remains a non-selected object 10B.

Further in accordance with this invention, if the area defined by the Stroke encompasses entirely or partially multiple activatable objects, all of the encompassed objects are selected simultaneously (see FIGS. 4H, 4I and 4J, and contrast with FIG. 4K).

Figure 3A:
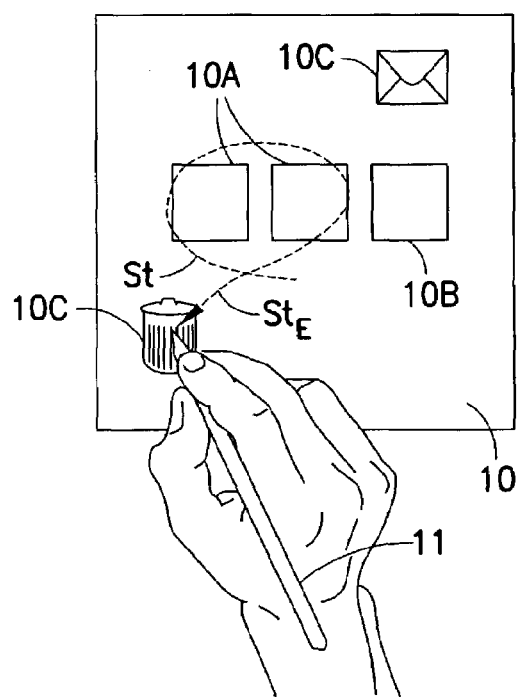
Figure 3B:
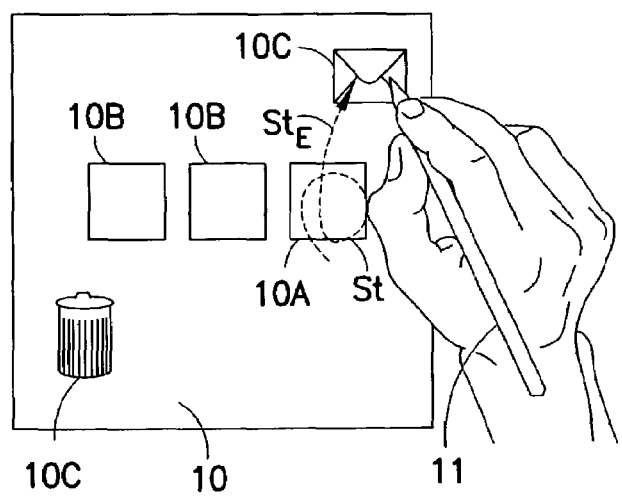
FIG. 3B shows an example of a process for selecting a single object and associating the selected object with an application.

FIG. 3A shows an example of a process for selecting multiple objects and associating the multiple selected objects with an application, while FIG. 3B shows an example of a process for selecting a single object and associating the selected object with an application.

First, the user selects a plurality of objects (FIG. 3A) or a single object (FIG. 3B) by drawing a Stroke that at least partially contains the object(s), as described above. Then, without lifting pen 11, the user extends the Stroke (St$_E$) to some functional object 10C. In FIG. 3A the selected functional object 10C is a Delete object or application, while in FIG. 3B the selected functional object 10C is an email object or application. The stroke-based selection algorithm 14A interprets the movements of the pen 11 to select the object or objects that are enclosed (at least partially) by the Stoke St, and to then activate the functional object 10C that is coincident with the end point of the Stroke extension St$_E$. The selected target object(s) 10A are activated or processed in a manner that is consistent with the functionality of the selected functional object 10C. The result is equivalent to a single object (FIG. 3B), or a multiple object (FIG. 3A), drag-and-drop operation.

In the example of FIG. 3A the two selected target objects 10A are deleted by dragging them to the Delete functional object 10C, while in FIG. 3B the selected target object 10A is sent from the device 1 by attachment to an email. For the case of a handheld communications device embodiment of this invention, the email may be sent over a radio channel from the handheld communications device to a remote receiver, such as a base station.

It should be appreciated that this invention largely eliminates the problems of the prior art related to inadvertent and unwanted object selections and activations, as contact that results in stray points and lines on the touch screen are essentially filtered out, and are not recognized by the display processor 12. This can be especially useful for the case of the handheld communications and other types of devices, as the user may be operating same while in motion on a train, or while a passenger in a moving automobile. Both of these are situations where the user may have difficulty in operating the touch screen display 10 because of motion and vibration.

While described in the context of certain specific examples and preferred embodiments thereof, those skilled in the art should realize that this invention is not limited to only these examples and preferred embodiments, as it is expected that those skilled in the art may derive various modifications to the teachings of this invention when guided by the foregoing description.

What is claimed is:

1. A method to operate a touch screen user interface, comprising:
    forming a stroke that encloses an area that contains at least a portion of at least one displayed object that represents data; and
    selecting the at least one displayed object, where forming the stroke further comprises extending the stroke to a functional object, and activating the functional object with the at least one selected displayed object.

2. A method to operate a touch screen user interface, comprising:
    forming a stroke that encloses an area that contains at least a portion of at least one displayed object that represents data; and
    selecting the at least one displayed object, where the stroke does not define an area that is totally enclosed by the stroke, and further comprising automatically continuing the stroke such that the area is totally enclosed by the stroke.

3. A method as in claim 2, where the stroke is automatically continued by drawing a line that connects a stroke starting point to a stroke ending point, and by adding touch screen coordinates covered by the line to a list of touch screen coordinates that describe the stroke.

4. A device comprising a touch screen and a display processor coupled to the touch screen, said touch screen and display processor comprising a device user interface, said display processor operating in accordance with a stored program that is responsive to a user forming a stroke on the touch screen for determining an area encompassed by the stroke, and for indicating whether at least one displayed object is contained wholly or partially within the determined area, where the at least one displayed object represents data, where said display processor further operates, in response to the stroke being extended to a functional object, for signaling an activation of the functional object with the at least one selected displayed object.

5. A device as in claim 4, where said display processor further operates, in response to the stroke enclosing an area that contains at least a portion of a plurality of displayed objects, to simultaneously select each of the plurality of displayed objects.

6. A device comprising a touch screen and a display processor coupled to the touch screen, said touch screen and display processor comprising a device user interface, said display processor operating in accordance with a stored program that is responsive to a user forming a stroke on the touch screen for determining an area encompassed by the stroke, and for indicating whether at least one displayed object is contained wholly or partially within the determined area, where the at least one displayed object represents data, where the stroke does not define an area that is totally enclosed by the stroke, and where said display processor further operates to automatically continue the stroke such that the area is totally enclosed by the stroke.

7. A device as in claim 6, where the stroke is automatically continued by drawing a line that connects a stroke starting point to a stroke ending point, and by adding touch screen coordinates covered by the line to a list of touch screen coordinates that describe the stroke.

8. A handheld communications device having a graphical user interface that comprises a touch screen display and a display processor coupled to the touch screen display, said display processor operating in accordance with a stored program to be responsive to a user of the handheld communications device forming a stroke on the touch screen display for determining an area encompassed by the stroke, and for indicating whether at least one displayed icon is contained wholly or partially within the determined area, where the at least one displayed icon represents data, where said display processor further operates, in response to the stroke being extended by the user to a functional object, for signaling an activation of the functional object with the at least one selected displayed icon.

9. A handheld communications device as in claim 8, where said display processor further operates, in response to the stroke enclosing an area that contains at least a portion of a plurality of icons, to simultaneously select each of the plurality of displayed icons.

10. A handheld communications device having a graphical user interface that comprises a touch screen display and a display processor coupled to the touch screen display, said display processor operating in accordance with a stored program to be responsive to a user of the handheld communications device forming a stroke on the touch screen display for determining an area encompassed by the stroke, and for indicating whether at least one displayed icon is contained wholly or partially within the determined area, where the at least one displayed icon represents data, where the stroke does not define an area that is totally enclosed by the stroke, and where said display processor further operates to automatically continue the stroke such that the area is totally enclosed by the stroke.

11. A handheld communications device as in claim 10, where the stroke is automatically continued by drawing a line that connects a stroke starting point to a stroke ending point, and by adding touch screen coordinates covered by the line to a list of touch screen coordinates that describe the stroke.

12. A handheld device comprising: graphical user interface means comprising a touch screen display means and display processor means coupled to the touch screen display means, said display processor means responsive to execution of a stored program to respond to a user forming a stroke on the touch screen display means for determining a touch screen display means region enclosed by the stroke, for determining whether at least one displayed icon is contained within the determined region and, if so, for identifying a contained displayed icon as a target icon, where the at least one displayed icon represents at least one file containing data; and where said display processor means is further responsive to the stroke being extended to a displayed functional object, for signaling an activation of the functional object with the at least one file represented by the target icon.

13. A handheld device as in claim 12, where said display processor further operates, in response to the stroke enclosing a region that contains a plurality of displayed icons, to select each of the plurality of displayed icons.

14. A handheld device as in claim 12, where said display processor means is responsive to a case that the stroke does not completely enclose the touch screen display means region, to complete the stroke so that it does completely enclose the touch screen display means region.

15. A handheld device as in claim 12, where said handheld device is comprised of a wireless communications device.

16. A computer readable storing medium embodied with computer code for directing a computer to implement a graphical user interface having a touch screen display and to perform operations of:
  responsive to a user forming a stroke on the touch screen display, determining a touch screen display region enclosed by the stroke;
  determining whether at least one displayed icon is contained within the determined region and, if so, identifying a contained displayed icon as a target icon, where the at least one displayed icon represents at least one file containing data; and
  responsive to the stroke being extended to a displayed functional object, signaling an activation of the functional object with the at least one file represented by the target icon.

17. A computer readable storing medium as in claim 16, further comprising an operation of, responsive to the stroke enclosing a region that contains a plurality of displayed icons, selecting each of the plurality of displayed icons as a target icon.

18. A computer readable storing medium as in claim 16, responsive to a case that the stroke does not completely enclose the touch screen display region, performing an operation of completing the stroke so that it does completely enclose the touch screen display region.

19. A computer readable storing medium as in claim 16, where said computer-readable medium is embodied within a wireless communications device.

* * * * *